Dec. 21, 1965 H. P. FURTH 3,225,285
BRUSHLESS GENERATOR FOR HIGH-POWERED ELECTRICAL PULSES
Filed July 16, 1962
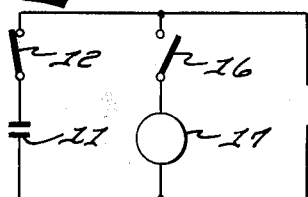
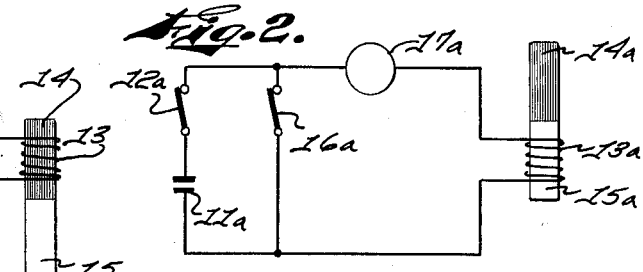
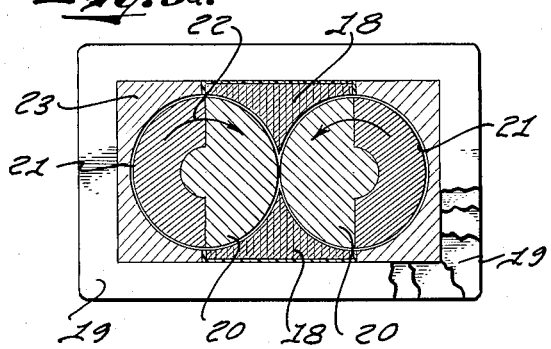
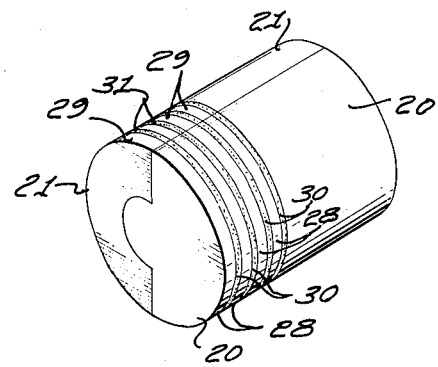
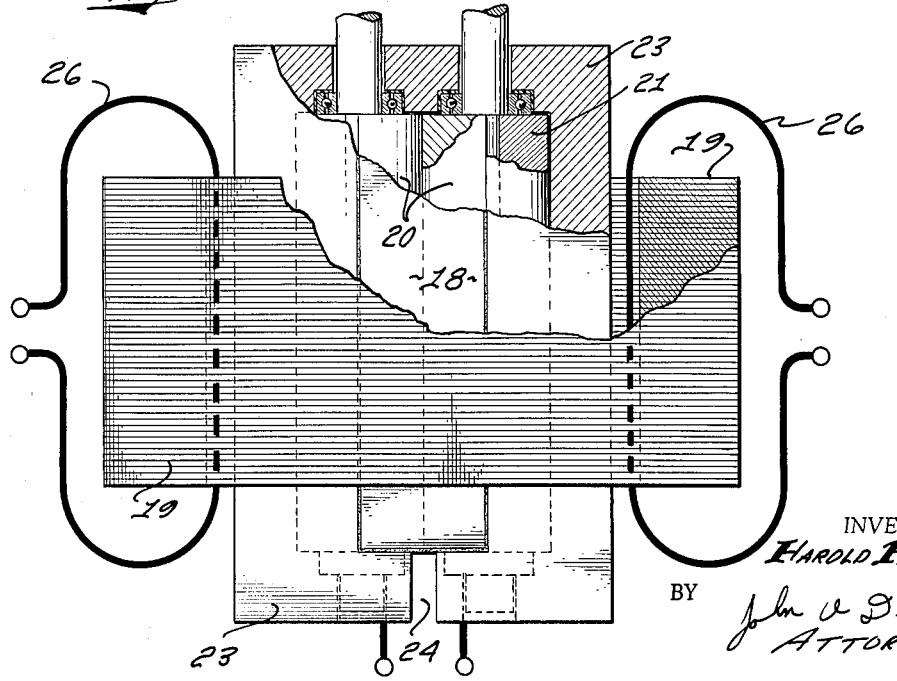
INVENTOR.
HAROLD P. FURTH
BY
John V. Duffy
ATTORNEY United States Patent Office 3,225,285
Patented Dec. 21, 1965

3,225,285
BRUSHLESS GENERATOR FOR HIGH-POWERED
ELECTRICAL PULSES
Harold P. Furth, Berkeley, Calif., assignor to Advanced Kinetics, Inc., Costa Mesa, Calif., a corporation of California
Filed July 16, 1962, Ser. No. 210,078
8 Claims. (Cl. 322—51)

The present invention relates generally to the generation of pulsed electrical power by rotary equipment, and more particularly to a pulse-generator that operates without current-carrying brushes, and that is able to deliver very large currents and total amounts of energy during short times.

Large energy densities can be stored in the form of kinetic energy of a mechanical rotor, and can be extracted in the form of electrical energy pulses, if the rotor is decelerated by magnetic forces. To achieve maximal energy density and maximal rates of energy extraction, the rotor must be mechanically strong, large magnetic fields must appear during the deceleration process, and large currents must flow. Pulse generators known in the art which produce high current pulses are limited in performance by the brushes associated therewith. Accordingly, it is an object of this invention to provide an improved generator for providing high current electrical pulses by the deceleration of the rotor.

An object of the present invention is to provide a pulse-generator that operates without current-carrying brushes between the rotating and stationary parts, so that the generation of large currents is not limited by the performance of brushes. Another object of the present invention is to provide a pulse-generator of very solid mechanical construction, in which large magnetic fields are produced during the deceleration of the rotors, so that from a unit of moderate size a very large amount of power can be generated for a short time.

Additional objects and advantages of the present invention will become apparent from the following description and appended claims.

In the drawings:

FIGURE 1 is a schematic circuit diagram illustrating the operation of the brushless generator.

FIGURE 2 is an alternative schematic circuit diagram illustrating the operation of the brushless generator.

FIGURE 3a is a schematic sectional side-view of the brushless generator. FIGURE 3b is a schematic top view of the brushless generator.

FIGURE 4 is a schematic perspective view of a rotor of the brushless generator, and of the component parts of the rotor. According to a principal aspect of the invention a pulse generator is provided in which the rotor is decelerated by magnetic action to produce high current pulses. A magnetic field is provided by a conductor responsive to a source of auxiliary energy. A rotor having part low reluctance material and part electrical conductive material is disposed within the magnetic field. When the rotor is in an open position the low reluctance material is within the magnetic field to provide a closed path for the flow of flux. When the rotor is in a closed position, the electrical conductive action between the flux in the magnetic field and the electrical conductive material causes the rotor to decelerate generating a high current in the conductor.

A piece of rotating equipment used as a pulsed electrical energy source should be operated at maximum rotational velocity in order to be optimally efficient in terms of weight and cost. The upper limit to the rotational velocity is set by the centrifugal pressure, which must be balanced by the tensile strength of the rotor. Since the centrifugal pressure, expressed in units of energy density, is of the same order of magnitude as the stored kinetic energy density of rotation, it follows that the maximum storable energy density is of the same order of magnitude as the ultimate tensile strength of the rotor, expressed in units of energy density.

For a rotor made of solid copper, the ultimate tensile strength of 40,000 p.s.i. corresponds to an energy density of some 400 joules per cc., or a rotational velocity of $3.10^4$ cm./sec. For safe operation, these figures must be reduced somewhat, or else stronger metals than copper may be used, for example, beryllium copper, or cadmium copper, or chromium copper.

In the energy-extraction process, the rotor must be decelerated suddenly. If this decleration takes place in half a turn of the rotor, the decelerating pressures are of the same order of magnitude as the centrifugal pressure before decleration. Therefore a rotor moving at maximum velocity cannot be arrested faster than in about half a turn. To arrest the rotor within half a turn, the magnetic fields acting on the rotor during the deceleration process must exert a pressure that is comparable to the stored energy density of the rotor before deceleration. For the example of the copper rotor, the appropriate magnetic field strength is roughly 300,000 gauss. In conjunction with this pulse magnetic field, a pulsed current of about 300,000 amperes per cm. radius of the rotor will be developed.

A rotor and a generator frame that can withstand the strong magnetic fields and mechanical pressures of maximal-velocity, minimal-extraction-time operation, must evidently be of very solid mechanical construction. The structural problems are similar to those encountered in the construction of ultra-high-field magnets, where the solution is found to lie in the maximal use of solid-metal components, the minimal use of fragile high-voltage insulation, and operation under high-current rather than high-voltage conditions. In a piece of rotating equipment that meets these design features, extremely large pulsed currents tend to be developed. To pass such currents from the generator frame to the rotors by means of brushes becomes impractical, because of the extreme forces exerted on the brushes, and because of the extreme tendency toward brush erosion by thermal effects.

An object of the present invention is to provide a piece of rotating equipment for pulsed electrical energy generation that is mechanically very strong and that avoids the use of brushes. In this pulse-generator, magnetic fields of order 100,000 gauss and more can be developed during deceleration of the rotors, and currents of many millions of amperes may circulate within the rotors during declaration. Comparable currents, or somewhat smaller currents if desired, will be delivered in the output pulse of the generator.

A pulse-generator designed in accordance with the present invention makes use of small auxiliary energy source, normally a capacitor bank. At the time when energy extraction from the rotors is desired, the auxiliary energy source is used to set up very rapidly a weak magnetic field within a flux-generator coil. The flux-generator coil is normally operated with a laminated-steel yoke, to reduce the energy stored in the return magnetic flux on the outside of the flux-generator coil. The rotors of the generator are so disposed within the flux-generator coil, that during each cycle of rotation there is alternately a period when the rotors permit easy passage of the magnetic flux through the flux-generator coil, and there is alternately a period when the rotors block off the flux passage almost completely. For this purpose, the rotors are normally made in part of laminated steel and in part of solid conductor, such as copper. During each cycle of rotation there is a period when the rotors are in such a position as to complete the low-reluctance magnetic circuit of the external laminated-steel yoke, and there is a period when the flux-path is obstructed by solid conductor. The physical dimensions and the time scale of the energy-extraction process are presumed to be such that the electric skin effect prevents effective penetration of magnetic flux into the solid-conductor parts of the rotors. For copper, the skin depth corresponding to a pulse in the millisecond range is about three millimeters. For a rotor moving at $10^4$ cm./sec. and having 10 cm. radius, the energy-extraction time is seen to be less than a millisecond, and the flux-penetration into the solid-conductor part of the rotor is seen to be only slight. For example, according to the equation $s=yt$, where $s$ is the penetration depth, $y$ is the resistivity, and $t$ the duration of the transient, the penetration in copper for one millisecond is approximately .3 cm. The auxiliary energy source is used to set up a weak field within the generator coil during that period of the rotation cycle when the rotors are in the "open" position, that is to say, when they permit easy passage of magnetic flux through the generator coil. As the rotors turn toward the "closed" position, where they obstruct the passage of flux through the generator coil, they act to compress the initial flux and to expel it from the generator coil. The flux is compressed since the flux density varies according to the equation $$\frac{A_0}{A_1} = \frac{B_1}{B_0}$$

with the area represented by $A_0$ and $A_1$, greatly decreasing as the rotors turn toward the closed position. Thus the flux density represented by $B_0$ and $B_1$ increases as the area is decreased. In this manner flux is compressed as the area decreases and is expelled as the area increases. The compression of the initial flux corresponds to an increase of the initial magnetic field and the initial current in the generator coil, and to multiplication of the energy content of the initial flux. This increase of magnetic energy represents work done on the initial magnetic flux by the rotors, and corresponding deceleration of the rotors. As a result, the auxiliary energy source tends to be recharged to a higher energy content. Normally it will be desired to impart energy to a load, rather than to multiply the initial energy content of the auxiliary energy source. For this purpose, a load circuit may be closed across the terminals of the flux-generator coil, immediately after the auxiliary energy source has generated the initial flux. As the initial flux is expelled from the generator coil, it will then be driven mostly into the load, provided the load impedance is made suitably small relative to the auxiliary source impedance. The net effect is therefore to impart to the load an energy that is a certain multiple of the initial energy of the auxiliary energy source. The magnetic energy of the flux is multiplied by compression since magnetic energy rises and falls according to the equation:

$$B^2 A = \frac{O^2}{A}$$

Therefore when A decreases and the flux is compressed, B rises. Energy may in a sense be said to be consumed since the multiplication of the initial magnetic energy is accomplished by means of extracting mechanical energy from the turning rotor which does work when it compresses the flux. It is readily seen that the energy multiplication caused by the motion of the rotors is equal to the ratio of the generator-coil inductances in the "open" and "closed" positions. If no ferromagnetic materials were used, this ratio could not easily be made much larger than about 10. With the laminated steel construction, the initial inductance can be made very large, provided that initial fields below 10,000 gauss are used. As the rotors move towards the "closed" position, the magnetic field is raised into the 100,000 gauss range, the steel is magnetically saturated, and the inductance may readily be reduced by a factor of 100 or more. Therefore the cost of the auxiliary energy source need not represent a significant element in the economics.

A basic circuit in accordance with the present invention is illustrated in FIGURE 1. The auxiliary energy source 11 is discharged by means of the switch 12 into the flux-generator coil 13 at a time when the rotors are in the "open" position. The "open" position is indicated in FIGURE 1 by the presence of a laminated steel core 14 within the flux-generator coil 13. The subsequent "closed" position of the rotors in FIGURE 1 is indicated by the presence of the solid-conductor core 15 within the flux-generator coil 13. Following the discharge of the auxiliary energy source, the switch 16 is closed, while the rotors are still approximately in the "open" position. As the rotors subsequently move toward the "closed" position, the flux of the flux-generator coil is driven mostly into the load 17. If the impedance of the load 17 is small compared with that of the auxiliary energy source an amount of electrical energy is deposited in the load 17 that is roughly equal to the initial energy of the auxiliary energy source multiplied by the ratio of the inductance of the flux-generator coil with the core 14, as against its inductance with the core 15. As the rotors move on toward the "open" position, the energy of the load tends to be re-extracted. This development may be desirable for some purposes, such as avoidance of over-heating in the load. On the other hand, if the energy is desired to remain in the load, a switch may be closed across the load during the time when the rotors are in the "closed" position.

An alternative basic circuit is illustrated in FIGURE 2. The design of this circuit is precisely like that of FIGURE 1, except that the load 17a is connected in series with the flux-generator coil 13a rather than in series with the switch 16a. The impedance of the load 17a is presumed to be small compared to the impedance of the flux-generator coil 13a. When the auxiliary energy source 11a is discharged, most of the initial flux is delivered to the flux-generator coil 13a, and subsequently the switch 16a is closed. As the rotors move from the "open" position to the "closed" position, the flux is expelled from the flux-generator coil 13a and is driven entirely into the load 17a.

The physical construction of a typical pulse-generator designed in accordance with the present invention is shown in FIGURE 3. An initial flux is set up within the magnetic circuit comprising the pole pieces 18, the return-flux yoke 19, and the laminated-steel parts 20 of the rotors. All these components are laminated sufficiently finely so that magnetic field can penetrate readily during a pulse of typical millisecond duration. Accordingly, the laminations are typically of cm. thickness. The laminations are aligned in planes perpendicular to the axes of the rotors. Each rotor has a part 21 made of solid conductor. The directions of rotation are indicated by the arrows 22. The rotors are mounted in the flux-generator coil 23, which is typically a solid block of conductor with a central cut-out that houses the rotors. There is an insulated slit 24 between the central cut-out and the outside of the coil, and the leads 25 to the load-circuit are attached on either side of this slit. The initial flux may be generated by an auxiliary energy source in the load circuit, as in the illustrations of FIGURES 1 and 2, or alternatively there may be a winding 26 on the return-flux yoke 19, into which the auxiliary energy source may be discharged. The winding 26 may be a multi-turn winding, designed to match the impedance of the auxiliary energy source conveniently. The flux-generator coil 23 is typically a single-coil, but can be modified to a multi-turn coil by splitting the conductor in one or more planes parallel to the plane that contains the rotor axes, and by connecting the resultant separate turns of conductor in series. FIGURES 3a and b show the rotors in the "open" period of their cycle, when there is an easy flux path through the flux-generator coil 23.

The initial flux is set up during the "open" period, and is compressed and expelled from the flux-generator coil as the rotors move towards the "closed" position. The only point in the machine where a substantial electric field develops during the flux-extraction phase is in the slit 24. The rotors need not be well insulated from each other or from the flux-generator coil, but should preferably be insulated somewhat to prevent damage due to low-voltage, high current arcs. The rotors are typically supported within the flux-generator coil by means of bearings at the periphery of the rotors. As the rotors enter the "closed" period of their cycle, a large force acts to separate their axes, and this force must be transmitted by the bearings to the flux-generator coil. The flux-generator coil is thus subjected to a force tending to enlarge it and to open up the slit 24. According, strong mechanical support must be provided to prevent the enlarging of the flux-generator coil. Such mechanical support may be provided in part by means of the return-flux yoke 19.

A possible structure for the rotors of the pulse-generator of FIGURE 3 is indicated in FIGURE 4. Each rotor is composed of steel plates 28 and conductor plates 29, typically made of copper or bronze. Between each pair of steel plates 28, there is an insulating plate 30, that has the same contour as 28, but is only a fraction as thick. Between each pair of conductor plates 29 there is another conductor plate 31 that has the same contour as 29 and has the same thickness as 30. The contour plates 29 and 31 are fastened firmly together, by means of draw-bolts parallel to the rotor axis, or by soldering or welding. The outer surface of the conducting part 21 of the rotor should be a solid conductor to a radical depth of about a centimeter, and therefore the outer edges of the conductor plates 29 and 31 should be welded together to such a depth. Each conductor plate 29 is welded to the corresponding steel plate 28. The insulator plates 30 are attached by a glue or plastic bond to the steel plates 28. The laminated steel part 20 of the rotor may also be drawn together by insulated bolts parallel to the axis of the rotor. In order that the rotor may be balanced, the mass-density distribution should be approximately symmetric around the axis of the rotor. This purpose may be achieved by introducing cavities into the conductor part of the rotor, which will ordinarily have a higher mass density than the laminated-steel part. These cavities may be filled with a lighter material.

Various of the novel features of the present invention are set forth in the following claims.

I claim:
1. In an electric generator for producing high current pulses,
   an auxiliary energy source,
   a conductor responsively connected to said energy source for creating a magnetic field,
   rotating element means having part low reluctance material and part electrical conducting material disposed within said magnetic field,
   said rotating element means being in an open position with respect to said field when said low reluctance material is within said magnetic field and in a closed position when said electrical conductive material is within said magnetic field,
   said rotating element means decelerated by the interaction between said magnetic field and said electrical conductive material when said rotor is in said closed position.

2. The electric generator of claim 1 wherein said rotating element means comprises a pair of tangentially spaced rotors having parallel axes of rotation.

3. The electric generator of claim 1 wherein is included a yoke of low reluctance material within said magnetic field.

4. In an electric generator for producing high current pulses,
   a flux generator coil,
   a rotating element within the magnetic field of said coil having a low reluctance part and an electrical conductive part,
   said low reluctance part being within said magnetic field during one half cycle of rotation and said electrical conductive part being within said magnetic field during the other half angle of rotation,
   an auxiliary energy source responsively connected to said flux generator coil to generate flux in said magnetic field during the half cycle of rotation when said low reluctance part is within said magnetic field,
   said electrical conductive part reading with said magnetic field to compress said generated flux during the other half cycle of operation, whereby said compressed flux generates a high current pulse in said flux generator coil.

5. The electric generator of claim 4 wherein is included a yoke of low reluctance material within said magnetic field.

6. The electric generator of claim 4 wherein is included a load connected in series between said energy source and said flux generator coil and means for disconnecting said energy source from said flux generator coil when said flux is compressed.

7. In an electric generator for producing high current pulses,
   a flux generating coil,
   a yoke of low reluctance material disposed within the magnetic field of said flux generating coil,
   a pair of tangentially spaced counter rotating rotors having parallel axes of rotation disposed within said flux generating coil for rotation,
   each of said rotors having part low reluctance material and part electrical conductive material,
   said rotors disposed to be in an open position at the same time for each cycle of rotation with the low reluctance material part of both said rotors being within said magnetic field to permit easy passage of flux,
   and said rotors disposed to be in a closed position at the same time for each cycle of rotation with the electrical conductive material part of both said rotors being within said magnetic field to block the passage of flux,
   an energy source connected to said flux generating coil for generating flux when said rotors are in said open position,
   said flux being compressed when said rotors are in said closed position.

8. The electric generator of claim 7 wherein is included an output load connected to said flux generator coil when said rotors are in said closed position.

References Cited by the Examiner

UNITED STATES PATENTS 1,892,371 12/1932 Tuczek _____ 310—168
2,447,296 8/1948 Wall.

LLOYD McCOLLUM, *Primary Examiner.*